United States Patent
Roach

(10) Patent No.: US 10,775,829 B2
(45) Date of Patent: Sep. 15, 2020

(54) ADJUSTABLE VEHICLE PEDAL ASSEMBLY

(71) Applicant: Caterpillar Inc., Deerfield, IL (US)

(72) Inventor: Keegan Roach, Downer's Grove, IL (US)

(73) Assignee: Caterpillar Inc., Peoria, IL (US)

(*) Notice: Subject to any disclaimer, the term of this patent is extended or adjusted under 35 U.S.C. 154(b) by 32 days.

(21) Appl. No.: 16/275,053

(22) Filed: Feb. 13, 2019

(65) Prior Publication Data
US 2020/0257327 A1    Aug. 13, 2020

(51) Int. Cl.
| G05G 1/405 | (2008.04) |
| G05G 1/42 | (2008.04) |
| E02F 9/20 | (2006.01) |
| G05G 1/44 | (2008.04) |
| E02F 9/16 | (2006.01) |
| B60K 26/02 | (2006.01) |

(52) U.S. Cl.
CPC .............. *G05G 1/405* (2013.01); *G05G 1/42* (2013.01); *G05G 1/44* (2013.01); *B60K 26/02* (2013.01); *B60K 2026/026* (2013.01); *E02F 9/16* (2013.01); *E02F 9/2004* (2013.01)

(58) Field of Classification Search
CPC ............ G05G 1/405; G05G 1/44; G05G 1/40; G05G 1/38; G05G 1/36; B60K 2026/026; B60N 3/06; Y10T 74/20528; Y10T 74/20888; Y10T 74/209
See application file for complete search history.

(56) References Cited

U.S. PATENT DOCUMENTS

| 4,010,657 | A | 3/1977 | Amdall |
| 4,392,546 | A | 7/1983 | Brown et al. |
| 4,768,831 | A | 9/1988 | Liedberg et al. |
| 5,086,663 | A * | 2/1992 | Asano ............... B60T 7/06 74/512 |
| 6,073,515 | A | 6/2000 | Elton et al. |
| 6,431,021 | B1 * | 8/2002 | Djordjevic ......... G05G 1/405 74/512 |
| 9,499,084 | B2 | 11/2016 | Park |
| 2011/0108674 | A1 * | 5/2011 | Gardner ............ B64C 13/044 244/235 |

FOREIGN PATENT DOCUMENTS

| GB | 2288770 A | 11/1995 |
| GB | 2443915 A | 5/2008 |

OTHER PUBLICATIONS

STIC Search Report, Euel Cowan, dated Apr. 21, 2020 (Year: 2020).*

* cited by examiner

*Primary Examiner* — Patrick Cicchino
(74) *Attorney, Agent, or Firm* — Harrity & Harrity LLP

(57) ABSTRACT

An adjustable vehicle pedal assembly is disclosed. The adjustable vehicle pedal assembly may include a tray sub-assembly and a push rod sub-assembly. The tray sub-assembly may include a vehicle pedal, a splined shaft, and a tray that is slidable, relative to the splined shaft, to permit a position of the vehicle pedal to be adjusted. The push rod sub-assembly may engage a valve based on actuation of the vehicle pedal. A mechanical linkage between the tray sub-assembly and the push rod sub-assembly being maintained when the position of the vehicle pedal is adjusted.

20 Claims, 5 Drawing Sheets

ADJUSTABLE VEHICLE PEDAL ASSEMBLY

TECHNICAL FIELD

The present disclosure relates generally to vehicle pedals and, more particularly, to an adjustable vehicle pedal assembly.

BACKGROUND

A vehicle pedal assembly may provide a mechanical linkage between a vehicle pedal (e.g., a brake pedal) and a valve or another type of actuator (e.g., a brake valve). However, the components included in the vehicle pedal assembly may be fixed such that a position of the vehicle pedal cannot be adjusted without breaking the mechanical linkage between the vehicle pedal and the valve. As a result, the fixed components may prevent ergonomic positioning of the vehicle pedal in an operator station for an operator.

One approach disclosed in U.K. Patent Publication No. GB2443915A, that published on May 21, 2008 ("the '915 publication"), describes "an adjustable pedal device for a motor vehicle." In particular, the '915 publication describes "an adjustable pedal device for a motor vehicle . . . comprising a pedal whose pad possesses a position that can be adjusted in terms of height and advance, as well as inclination, between a first top extreme position that is less advanced in the cabin, and also closer to the vertical, in particular adapted to a tall driver, and a second bottom extreme position that is more advanced in the cabin and also closer to the horizontal, in particular adapted to a short driver."

While the '915 publication may describe "an adjustable pedal device for a motor vehicle," the '915 publication does not describe an adjustable vehicle pedal assembly that includes a tray sub-assembly and a push rod sub-assembly that permits adjustments to a vehicle pedal while maintaining a mechanical linkage between the vehicle pedal and a valve.

The adjustable vehicle pedal assembly of the present disclosure solves one or more of the problems set forth above and/or other problems in the art.

SUMMARY

According to some implementations, the present disclosure is related to an adjustable vehicle pedal assembly. The adjustable vehicle pedal assembly may include a tray sub-assembly and a push rod sub-assembly. The tray sub-assembly may include a vehicle pedal, a splined shaft, and a tray that is slidable, relative to the splined shaft, to permit a position of the vehicle pedal to be adjusted. The push rod sub-assembly may engage a valve based on actuation of the vehicle pedal. A mechanical linkage between the tray sub-assembly and the push rod sub-assembly may be maintained when the position of the vehicle pedal is adjusted.

According to some implementations, the present disclosure is related to an operator station of a vehicle. The operator station may include a valve and an adjustable vehicle pedal assembly. The adjustable vehicle pedal assembly may include a push rod sub-assembly and a tray sub-assembly. The push rod sub-assembly may include a push rod to engage with the valve. The tray sub-assembly may include a cam to engage with the push rod, a splined shaft to engage with the cam, and a tray that is slidable, relative to the splined shaft, to permit a position of a vehicle pedal to be adjusted. The cam may remain engaged with the push rod to maintain a mechanical linkage between the valve and the vehicle pedal when the position of the vehicle pedal is adjusted.

According to some implementations, the present disclosure is related to a method for using an adjustable vehicle pedal assembly. The method may include rotating, by a vehicle pedal, a first shaft of a tray sub-assembly included in an adjustable vehicle pedal assembly. The method may include rotating, by the first shaft and based on rotation of the first shaft, one or more gears included in the tray sub-assembly. The method may include rotating, by the one or more gears and based on rotation of the one or more gears, a second shaft included in the tray sub-assembly. The method may include rotating, by the second shaft and based on rotation of the second shaft, a cam included in the tray sub-assembly. The method may include pushing, by the cam and based on rotation of the cam, a push rod, of a push rod sub-assembly included in the adjustable vehicle pedal assembly, against a valve.

DETAILED DESCRIPTION

Figure 1:
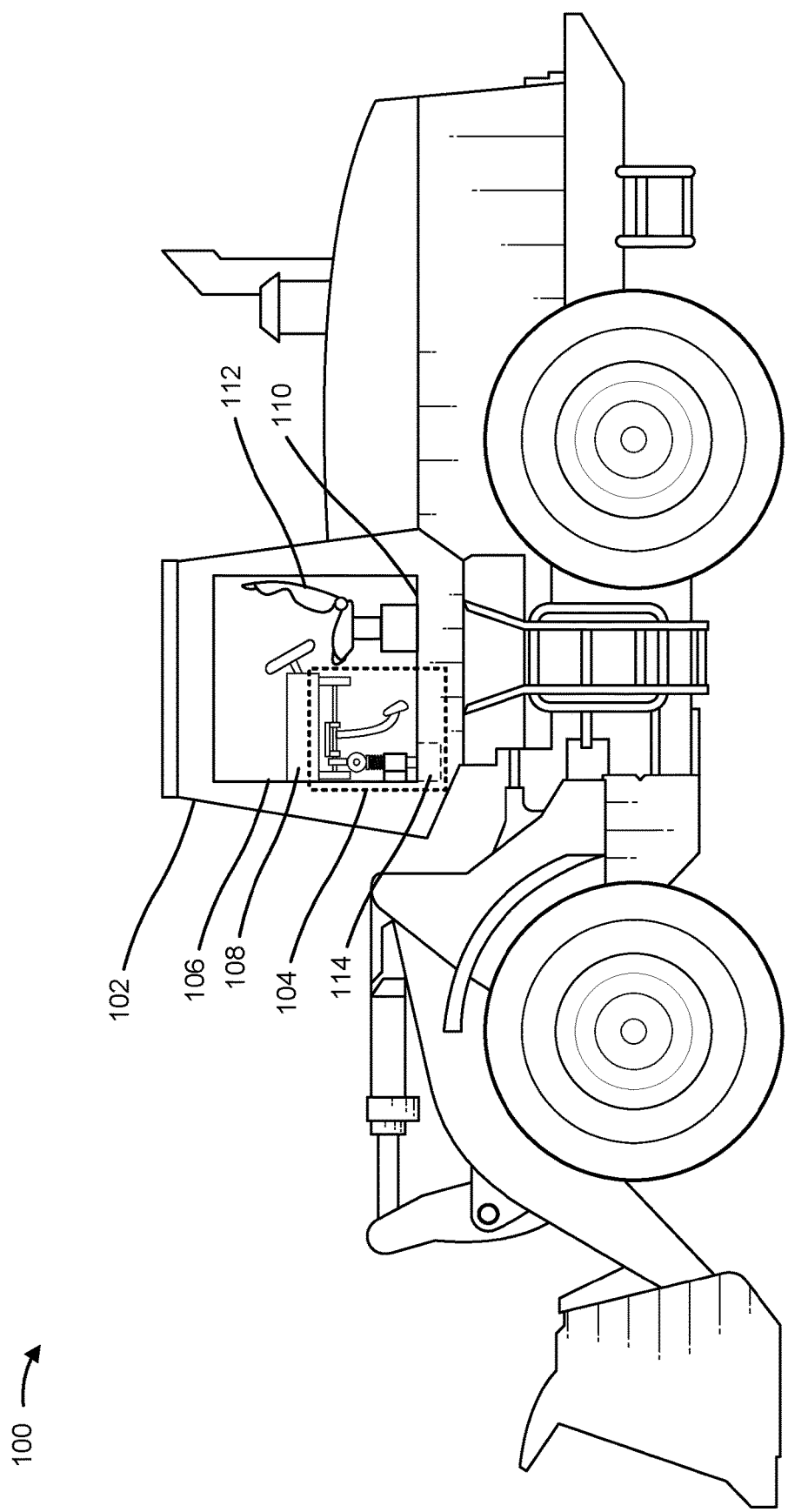
FIG. 1 is diagram of an example vehicle that includes an adjustable vehicle pedal assembly.

FIG. 1 is a diagram of an example vehicle 100 that includes an adjustable vehicle pedal assembly 104. Vehicle 100 may include a vehicle that performs some type of operation associated with an industry, such as mining, construction, farming, transportation, or the like. For example, vehicle 100 may be an earth moving machine, such as an excavator, a backhoe, a loader, a motor grader, or the like. Vehicle 100 may include an operator station 102 that includes adjustable vehicle pedal assembly 104, a front wall (or skin) 106, a dash 108, a floor 110, an operator seat 112, a valve 114, and/or the like.

Adjustable vehicle pedal assembly 104 may be removably attached and/or mounted to front wall 106 and an underside of dash 108. Valve 114 may be removably attached or mounted to operator station 102 under floor 110.

Adjustable vehicle pedal assembly 104 may include various types of vehicle pedal assemblies, such as a brake pedal assembly, an acceleration pedal assembly, a clutch pedal assembly, and/or the like. In some cases, if operator seat 112 is not adjustable, adjustable vehicle pedal assembly 104 may allow for ergonomic adjustments to accommodate various operator sizes even if operator seat 112 is not adjustable or of limited adjustability. In some cases, if operator seat 112 is adjustable, adjustable vehicle pedal assembly 104 may work in combination with operator seat 1120 to allow for ergonomic adjustments to accommodate various operator sizes.

Figure 2:
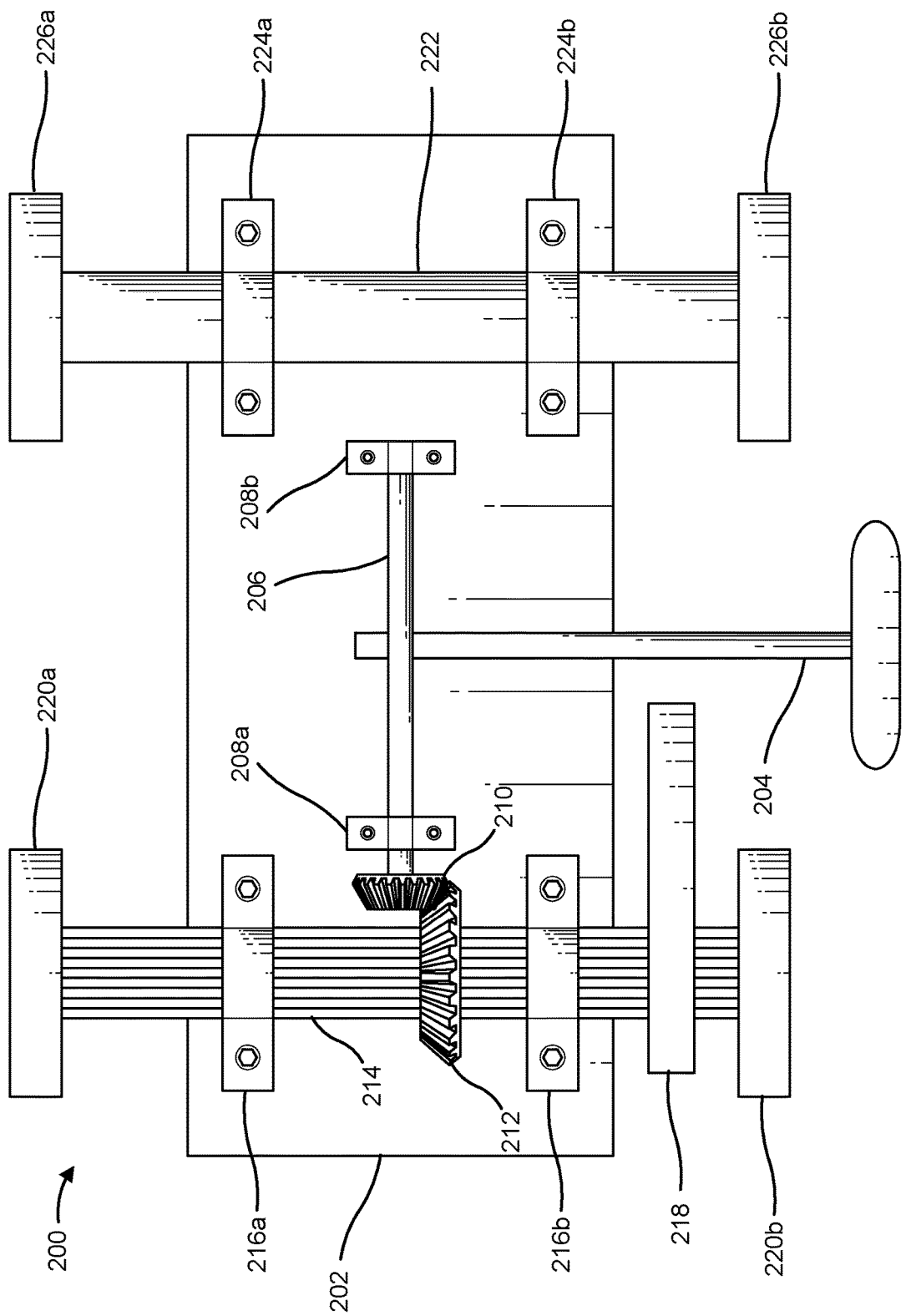
FIG. 2 is a diagram of an example push rod sub-assembly of an adjustable vehicle pedal assembly.

FIG. 2 is a diagram of an example tray sub-assembly 200 of adjustable vehicle pedal assembly 104. FIG. 2 may illustrate a bottom-up view of tray sub-assembly 200. That is, FIG. 2 may illustrate a view of tray sub-assembly from floor 110 of operator station 102 looking upward toward dash 108.

Tray sub-assembly 200 may include, for example, a tray 202, a vehicle pedal 204, a shaft 206, brackets 208a and 208b, a gear 210, a gear 212, a splined shaft 214, brackets 216a and 216b, a cam 218, bearings 220a and 220b, a shaft 222, brackets 224a and 224b, and brackets 226a and 226b.

Vehicle pedal 204 may include a brake pedal, an accelerator pedal, or another type of vehicle pedal, and may include various shapes and/or sizes of vehicle pedals. Vehicle pedal 204 may be removably attached to, fixed to, or integrated with shaft 206. Shaft 206 may be oriented substantially parallel to tray 202 and at a 90-degree angle (or substantially orthogonal) to vehicle pedal 204 such that vehicle pedal 204 suspends downward from dash 108.

Shaft 206 may be mounted to tray 202 via brackets 208a and 208b. Brackets 208a and 208b may include a circular or semi-circular opening in which shaft 206 may be inserted. In this way, shaft 206 may be permitted to rotate based on rotation of vehicle pedal 204. In some implementations, brackets 208a and 208b may include bearings, such as ball bearings, roller bearings, and/or another type of bearing that facilitates smooth rotation of shaft 206.

Shaft 206 may be removably attached to, fixed to, or integrated with gear 210 such that rotation of shaft 206 causes rotation of gear 210. Gear 210 may interact with gear 212 such that rotation of gear 210 causes rotation of gear 212. Gear 212 may be oriented at a 90-degree angle relative to gear 210. Gears 210 and 212 may include 45-degree bevel gears, crown gears, spur gears, spiral bevel gears, miter gears, and/or another type of gear that permits rotation to be translated between orthogonal axes.

Splined shaft 214 may be inserted into an interior opening in gear 212. The interior opening in gear 212 may be splined such that rotation of gear 212 causes rotation of splined shaft 214. Moreover, the interior opening in gear 212 may include linear bearings to permit gear 212 to slide smoothly relative to splined shaft 214. In some implementations, a pawl on each side of gear 212 may be used to slide gear 212 along splined shaft 214. Splined shaft 214 may be mounted to tray 202 via brackets 216a and 216b. Brackets 216a and 216b may similarly include interior openings that are splined and equipped with linear bearings to permit tray 202 to slide relative to splined shaft 214. Brackets 216a and 216b may further include ball splines (e.g., a combination of ball bearings and linear bearings) to facilitate smooth rotation of splined shaft 214 and to permit tray 202 to slide relative to splined shaft 214. Splined shaft 214 may be mounted to dash 108 of operator station 102 via bearings 220a and 220b, which may include ball bearings, roller bearings, and/or another type of bearing that facilitates smooth rotation of splined shaft 214.

Shaft 222 may be mounted to dash 108 and an opposite end of tray 202 to provide support on each end of tray 202. Shaft 222 may be mounted to tray 202 via brackets 224a and 224b, and may be mounted to dash 108 via brackets 226a and 226b. Shaft 222 may be fixed to dash 108 such that shaft 222 does not rotate. However, in some implementations, brackets 226a and 226b may include bearings that permit shaft 222 to rotate.

Tray 202 may slide forward and/or aft in operator station 102 along splined shaft 214 and shaft 222. In this way, tray 202 may be slid forward and/or aft in operator station 102 to facilitate adjustment of the position of vehicle pedal 204. As tray 202 slides, gear 212 remains mechanically linked to splined shaft 214 and gear 210 such that rotation of gear 210 (e.g., which may be caused by rotation of vehicle pedal 204 and shaft 206) may cause rotation of gear 212 and rotation of splined shaft 214 regardless of the position of tray 202.

Cam 218 may be removably attached to, fixed to, or integrated with splined shaft 214 such that rotation of splined shaft causes rotation of cam 218. Moreover, cam 218 may be attached to splined shaft 214 in a way that prevents cam 218 from sliding along splined shaft 214.

The various components included in tray sub-assembly 200 may be formed of various materials, such as metals, plastics, composites, and/or the like. The various components included in tray sub-assembly 200 may be sized and/or shaped depending on the size of operator station 102, dash 108, and/or other factors.

Figure 3:
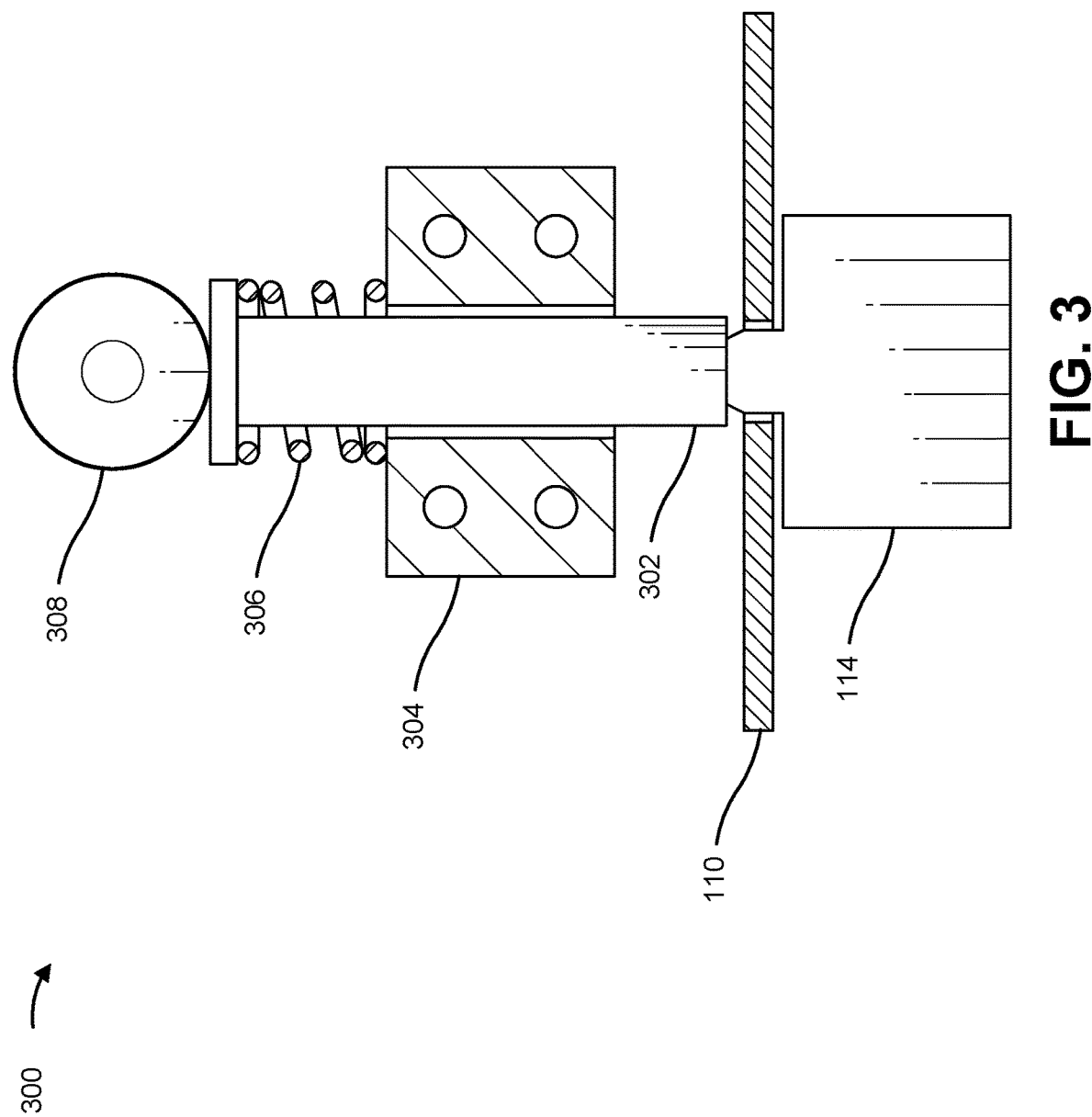
FIG. 3 is a diagram of an example tray sub-assembly of an adjustable vehicle pedal assembly.

FIG. 3 is a diagram of an example push rod sub-assembly 300 of adjustable vehicle pedal assembly 104. FIG. 3 may illustrate a cross-sectional plan view of push rod sub-assembly 300. Push rod sub-assembly 300 may include, for example, a push rod 302, a bracket 304, a spring 306, and a roller 308.

Push rod 302 may include a cylindrical-shaped rod, a square-shaped rod, or another shape of push rod. Push rod 302 may be used to actuate valve 114. For example, if valve 114 is a hydraulic valve, push rod 302 may engage valve 114 by pushing against valve 114 to release hydraulic fluid and may release pressure on valve 114 to restrict the flow of hydraulic fluid.

Push rod sub-assembly 300 may be mounted to front wall 106 of operator station 102 via bracket 304. In some implementations, bracket 304 may include a liner bearing that facilitates smooth sliding of push rod 302. Spring 306 may push upward against roller 308 to bias push rod 302 such that valve 114 is biased in an unactuated position. A force may be applied to roller 308 to overcome the biasing force of spring 306 to push downward on push rod 302 to cause push rod 302 to engage valve 114 by pushing against valve 114, which actuates valve 114.

The various components included in push rod sub-assembly 300 may be formed of various materials, such as metals, plastics, composites, and/or the like. The various components included in push rod sub-assembly 300 may be sized and/or shaped depending on the size of operator station 102, dash 108, and/or other factors.

Figure 4:
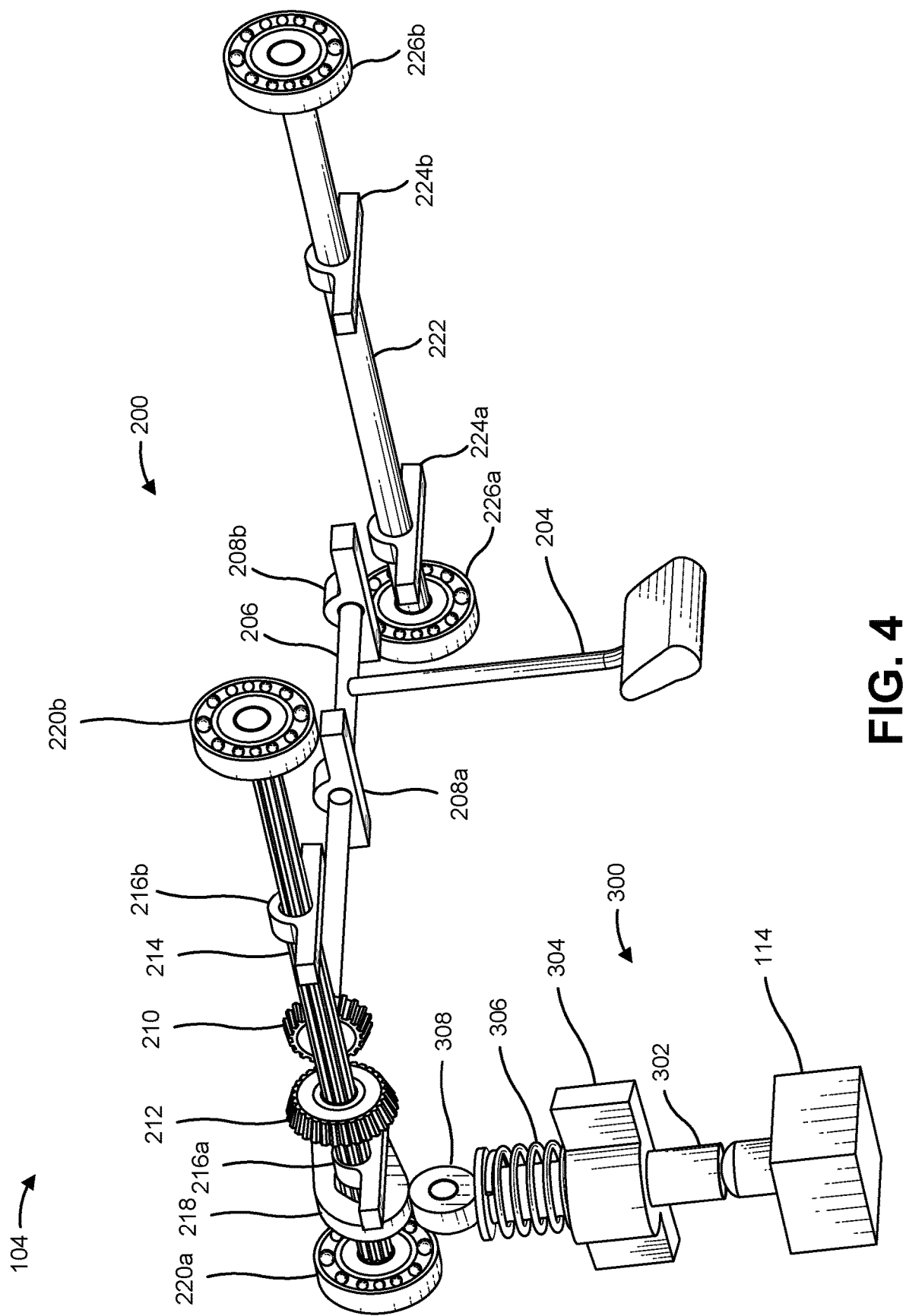
FIG. 4 is a diagram of an example adjustable vehicle pedal assembly that may be used with the vehicle of FIG. 1.

FIG. 4 is a diagram of adjustable vehicle pedal assembly 104. FIG. 4 may illustrate a perspective view of the interaction between tray sub-assembly 200 and push rod sub-assembly 300. Tray 202 has been omitted from FIG. 4 for purposes of clarity.

The interaction between tray sub-assembly 200 and push rod sub-assembly 300 may be facilitated by cam 218. When vehicle pedal 204 is rotated, the rotation causes rotation of shaft 206. The rotation of shaft 206 causes rotation of gear 210. The rotation of gear 210 causes rotation of gear 212. The rotation of gear 212 causes rotation of splined shaft 214. The rotation of splined shaft 214 causes rotation of cam 218. As cam 218 rotates, cam 218 pushes downward on roller 308. Roller 308 may rotate to facility smooth rotation of cam 218.

As cam 218 pushes downward on roller 308, the downward force on roller 308 may overcome the biasing force of spring 306 and push downward on push rod 302. The downward force on push rod 302 may cause push rod 302 to push against valve 114 which may cause actuation of valve 114. Actuation of valve 114 may cause, for example, a change in flow of hydraulic fluid (which, for example, may actuate a brake mechanism on vehicle 100), a change in acceleration of vehicle 100, a clutch to engage or disengage a transmission of vehicle 100, and/or the like.

When pressure on vehicle pedal 204 is released, the biasing force of spring 306 (as well as any force provided by valve 114) may push upward on push rod 302 and roller 308, which causes cam 218 to rotate. The rotation of cam 218 causes rotation of splined shaft 214, which causes rotation of gears 212 and 210. The rotation of gears 212 and 210 causes rotation of shaft 206, which causes vehicle pedal 204 to be rotated back to the normal resting position of vehicle pedal 204.

As indicated above, the position of vehicle pedal 204 may be adjusted by sliding tray 202 along splined shaft 214 and shaft 222. Tray 202 may be manually slid along splined shaft 214 and shaft 222 (e.g., an operator of vehicle 100 may manually slide tray 202 along splined shaft 214 and shaft 222) and/or may be automatically slid along splined shaft 214 and shaft 222 (e.g., by a linear actuator such as an electronic motor, a set of motorized linear bearings included in brackets 224a and 224b, and/or the like).

When tray 202 is slid along splined shaft 214 and shaft 222, gear 212 slides along splined shaft 214 to remain in contact with gear 210, which permits actuation of vehicle pedal 204 to rotate splined shaft 214 regardless of the position of tray 202. Since cam 218 is attached to splined shaft 214 such that cam 218 does not slide when tray 202 is slid along splined shaft 214, cam 218 remains in contact with push rod sub-assembly 300 via roller 308. In this way, the mechanical linkage between valve 114 and vehicle pedal 204 is maintained as vehicle pedal is adjusted forward and/or aft in operator station 102.

As indicated above, the number and arrangement of components and/or devices shown in FIGS. 1-4 are provided as an example. In practice, there can be additional components and/or devices, fewer components and/or devices, different components and/or devices, or differently arranged components and/or devices than those shown in FIGS. 1-4. Furthermore, two or more components and/or devices shown in FIGS. 1-4 can be implemented within a single component and/or device, or a single device and/or component shown in FIGS. 1-4 can be implemented as multiple, distributed components and/or devices. Additionally, or alternatively, a set of components and/or devices (e.g., one or more components and/or devices) shown in FIGS. 1-4 can perform one or more functions described as being performed by another set of components and/or devices shown in FIG. 1-4.

Figure 5:
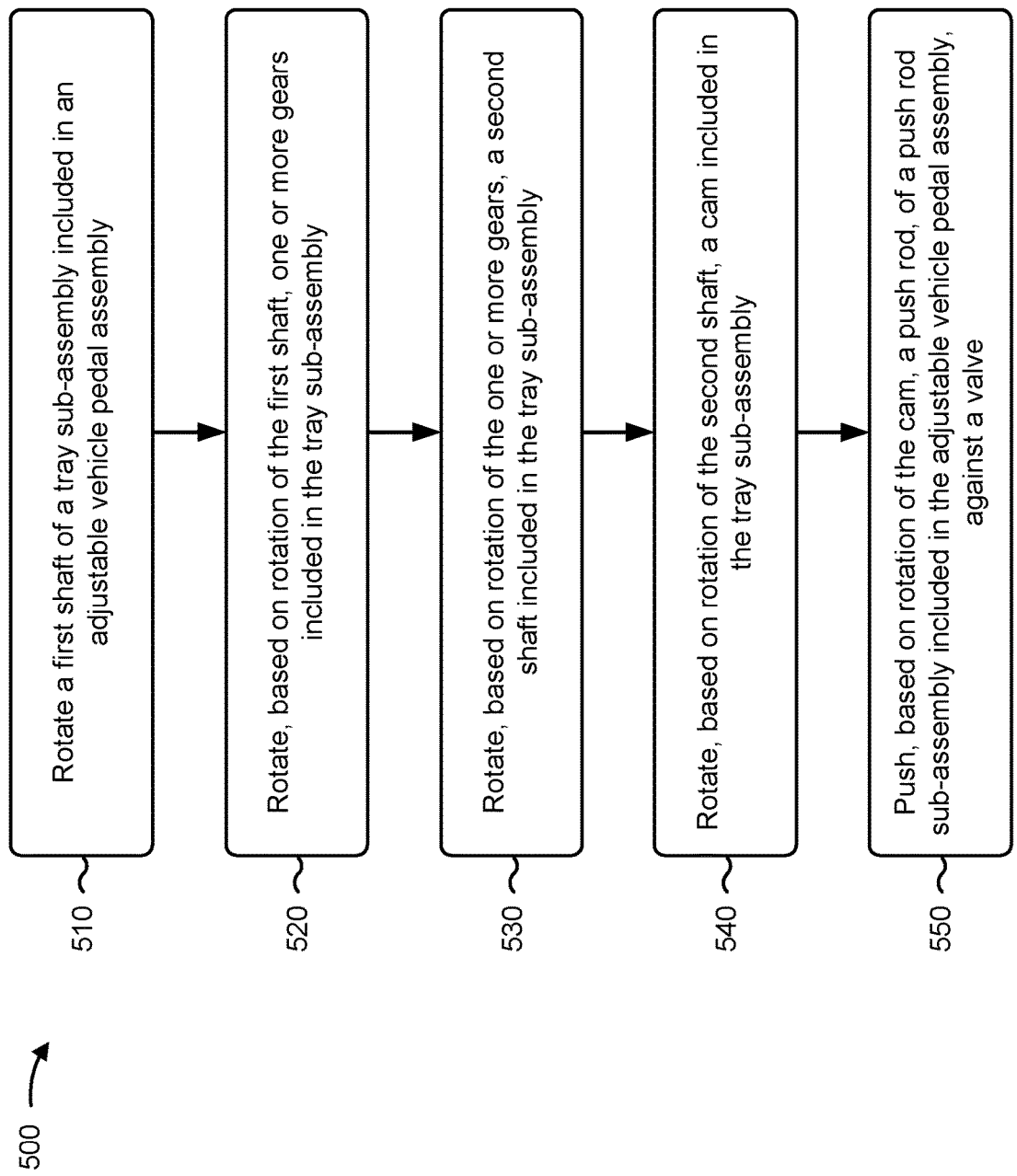
FIG. 5 is a flow chart of an example process for using the adjustable vehicle pedal assembly of FIG. 2.

FIG. 5 is a flow chart of an example process 500 for operating an adjustable vehicle pedal assembly. One or more process blocks of FIG. 5 may be performed by an adjustable vehicle pedal assembly (e.g., adjustable vehicle pedal assembly 104).

As shown in FIG. 5, process 500 may include rotating a first shaft of a tray sub-assembly included in an adjustable vehicle pedal assembly (block 510). For example, the adjustable vehicle pedal assembly (e.g., using vehicle pedal 204 and/or the like) may rotate a first shaft of a tray sub-assembly included in an adjustable vehicle pedal assembly.

As further shown in FIG. 5, process 500 may include rotating, based on rotation of the first shaft, one or more gears included in the tray sub-assembly (block 520). For example, the adjustable vehicle pedal assembly (e.g., using shaft 206 and/or the like) may rotate, based on rotation of the first shaft, one or more gears included in the tray sub-assembly. The adjustable vehicle pedal assembly may rotate the one or more gears by rotating a first gear and rotating, based on rotation of the first gear, a second gear that is oriented 90 degrees relative to the first gear.

As further shown in FIG. 5, process 500 may include rotating, based on rotation of the one or more gears, a second shaft included in the tray sub-assembly (block 530). For example, the adjustable vehicle pedal assembly (e.g., using gear 210, gear 212, and/or the like) may rotate, based on rotation of the one or more gears, a second shaft included in the tray sub-assembly.

As further shown in FIG. 5, process 500 may include rotating, based on rotation of the second shaft, a cam included in the tray sub-assembly (block 540). For example, the adjustable vehicle pedal assembly (e.g., using splined shaft 214 and/or the like) may rotate, based on rotation of the second shaft, a cam included in the tray sub-assembly.

As further shown in FIG. 5, process 500 may include pushing, based on rotation of the cam, a push rod, of a push rod sub-assembly included in the adjustable vehicle pedal assembly, against a valve (block 550). For example, the adjustable vehicle pedal assembly (e.g., using cam 218, roller 308, and/or the like) may push, based on rotation of the cam, a push rod, of a push rod sub-assembly included in the adjustable vehicle pedal assembly, against a valve.

Process 500 may include additional implementations, such as any single implementation or any combination of implementations described below and/or in connection with one or more other processes described elsewhere herein.

For example, the adjustable vehicle pedal assembly may adjust the tray sub-assembly relative to the push rod sub-assembly by sliding (e.g., using a linear actuator) a tray included in the tray sub-assembly relative to the second shaft via one or more linear bearings mounted to the tray. The cam and the second shaft may maintain a mechanical linkage between the valve and the vehicle pedal as the linear actuator slides the tray relative to the second shaft.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed adjustable vehicle pedal assembly (e.g., adjustable vehicle pedal assembly 104) may be used, in any operator station (e.g., operator station 102) of a vehicle (e.g., vehicle 100) where the capability of adjusting the position of a vehicle pedal (e.g., vehicle pedal 204) is desirable. An operator of the vehicle in which the adjustable vehicle pedal assembly is included may adjust the position of the vehicle pedal forward and/or aft in the operator station. A tray sub-assembly (e.g., tray sub-assembly 200) and a push rod sub-assembly (e.g., push rod sub-assembly 300) of the adjustable vehicle pedal assembly may maintain a mechanical linkage when the position of the vehicle pedal is adjusted. In this way, the adjustable vehicle pedal assembly may be used to achieve a variety of ergonomic operating configurations for various sizes of operators even when the size of the operating station may limit the adjustability of an operator seat (e.g., operator seat 112) in the operating station.

What is claimed is:

1. An adjustable vehicle pedal assembly, comprising:
   a tray sub-assembly, comprising:
      a vehicle pedal,
      a splined shaft, and a tray that is slidable, relative to the splined shaft, to permit a position of the vehicle pedal to be adjusted; and a push rod sub-assembly to engage a valve based on actuation of the vehicle pedal, a mechanical linkage between the tray sub-assembly and the push rod sub-assembly being maintained when the position of the vehicle pedal is adjusted.

2. The adjustable vehicle pedal assembly of claim 1, wherein the tray sub-assembly comprises:
a cam attached to the splined shaft,
wherein the actuation of the vehicle pedal causes the splined shaft and the cam to rotate; and
wherein the push rod sub-assembly comprises:
a push rod to engage the valve based on rotation of the cam.

3. The adjustable vehicle pedal assembly of claim 2, wherein the rotation of the cam causes the cam to push against the push rod; and
wherein the cam pushing against the push rod causes the push rod to push against the valve.

4. The adjustable vehicle pedal assembly of claim 2, wherein the cam remains engaged with the push rod to maintain the mechanical linkage when the position of the vehicle pedal is adjusted.

5. The adjustable vehicle pedal assembly of claim 1, wherein the actuation of the vehicle pedal causes one or more gears to rotate the splined shaft.

6. The adjustable vehicle pedal assembly of claim 5, wherein the one or more gears comprise at least one of:
a 45-degree bevel gear,
crown gear,
a spur gear,
a spiral bevel gear, or
a miter gear.

7. The adjustable vehicle pedal assembly of claim 5, wherein a gear, of the one or more gears, engages with the splined shaft via a splined interior opening of the gear.

8. An operator station of a vehicle, comprising:
a valve; and
an adjustable vehicle pedal assembly, comprising:
a push rod sub-assembly, comprising:
a push rod to engage with the valve; and
a tray sub-assembly, comprising:
a cam to engage with the push rod,
a splined shaft to engage with the cam, and
a tray that is slidable, relative to the splined shaft, to permit a position of a vehicle pedal to be adjusted, the cam remaining engaged with the push rod to maintain a mechanical linkage between the valve and the vehicle pedal when the position of the vehicle pedal is adjusted.

9. The operator station of claim 8, wherein the valve is mounted under a floor of the operator station; and
wherein the adjustable vehicle pedal assembly is mounted in the operator station of the vehicle.

10. The operator station of claim 8, wherein the push rod sub-assembly is mounted to a front wall of the operator station; and
wherein the tray sub-assembly is mounted to an underside of a dash of the operator station.

11. The operator station of claim 8, wherein the splined shaft is attached to the tray via one or more ball splines; and
wherein the push rod is mounted to a front wall of the operator station via one or more linear bearings.

12. The operator station of claim 8, wherein the cam engages with the push rod via a roller attached to the push rod; and
wherein the roller is biased against the cam via a spring included in the push rod sub-assembly.

13. The operator station of claim 8, wherein the tray is slidable, relative to the splined shaft, by a set of motorized linear bearings.

14. The operator station of claim 8, wherein the vehicle pedal is connected to the splined shaft by:
another shaft oriented 90 degrees relative to the vehicle pedal,
a first gear attached to the other shaft, and
a second gear, connected to the splined shaft, oriented 90 degrees relative to the first gear.

15. A method, comprising:
rotating, by a vehicle pedal, a first shaft of a tray sub-assembly included in an adjustable vehicle pedal assembly;
rotating, by the first shaft and based on rotation of the first shaft, one or more gears included in the tray sub-assembly;
rotating, by the one or more gears and based on rotation of the one or more gears, a second shaft included in the tray sub-assembly;
rotating, by the second shaft and based on rotation of the second shaft, a cam included in the tray sub-assembly; and
pushing, by the cam and based on rotation of the cam, a push rod, of a push rod sub-assembly included in the adjustable vehicle pedal assembly, against a valve.

16. The method of claim 15, wherein the first shaft is oriented 90 degrees relative to the vehicle pedal; and
wherein the first shaft is oriented 90 degrees relative to the second shaft.

17. The method of claim 15, further comprising:
sliding, by a linear actuator and relative to the second shaft, a tray included in the tray sub-assembly,
wherein the cam and the second shaft maintain a mechanical linkage, between the valve and the vehicle pedal, as the linear actuator slides the tray relative to the second shaft.

18. The method of claim 17, wherein sliding the tray comprises:
sliding the tray via one or more linear bearings mounted to the tray.

19. The method of claim 15, wherein rotating the one or more gears comprises:
rotating a first gear, and
rotating, based on rotation of the first gear, a second gear that is oriented 90 degrees relative to the first gear.

20. The method of claim 19, wherein the first gear and the second gear comprise:
a 45-degree bevel gear,
crown gear,
a spur gear,
a spiral bevel gear, or
a miter gear.

* * * * *